United States Patent [19]

Wilck et al.

[11] Patent Number: 5,736,208
[45] Date of Patent: Apr. 7, 1998

[54] HEAT SHRINKABLE ARTICLE

[75] Inventors: Manfred Hermann Otto Wilck, Neubiberg, Germany; Sean Michael Lewington, Swindon, England

[73] Assignee: Raychem GmbH, Ottobrunn, Germany

[21] Appl. No.: 557,152

[22] PCT Filed: May 25, 1994

[86] PCT No.: PCT/GB94/01136

§ 371 Date: Dec. 14, 1995

§ 102(e) Date: Dec. 14, 1995

[87] PCT Pub. No.: WO94/29886

PCT Pub. Date: Dec. 22, 1994

[30] Foreign Application Priority Data

Jun. 14, 1993 [GB] United Kingdom ............... 9312199

[51] Int. Cl.$^6$ ............................................. H01B 17/38
[52] U.S. Cl. .................... 428/34.9; 428/35.1; 428/913; 156/85; 174/189; 174/209; 174/DIG. 8; 29/887
[58] Field of Search ................... 428/34.9, 35.1, 428/910, 913; 174/DIG. 8, 209, 189, 178, 73.1; 156/84, 85, 86; 29/447, 887

[56] References Cited

U.S. PATENT DOCUMENTS

| 4,016,356 | 4/1977 | McLoughlin | 428/34.9 |
| 4,045,604 | 8/1977 | Clabburn | 428/35.1 |
| 4,804,733 | 2/1989 | Bataille | 428/34.9 |
| 4,816,309 | 3/1989 | Hutt et al. | 428/34.9 |
| 5,451,278 | 9/1995 | Nolf | 428/34.9 |

FOREIGN PATENT DOCUMENTS

| 0 101 248 A3 | 2/1984 | European Pat. Off. . |
| 0 253 731 A1 | 1/1988 | European Pat. Off. . |
| 2 604 037 | 3/1988 | France . |
| 932916 | 7/1963 | United Kingdom . |
| 1 434 719 | 5/1976 | United Kingdom . |
| 2 113 022 | 7/1983 | United Kingdom . |
| WO 90/02037 | 3/1990 | WIPO . |

*Primary Examiner*—Rena Dye
*Attorney, Agent, or Firm*—Herbert G. Burkard; Yuan Chao

[57] ABSTRACT

A heat shrinkable shed (2) is mounted on a power cable (12) and sealed thereto by a hot-melt adhesive (10). Four projections (8) are equispaced around the interior surface of the shed (2) to penetrate the adhesive (10) and to engage the outer surface of the cable (12) to enhance the longitudinal retention of the shed (2) on the cable (12), particularly under conditions of thermal cycling.

11 Claims, 1 Drawing Sheet for many years, for example being shrunk into# HEAT SHRINKABLE ARTICLE

SUMMARY OF THE INVENTION

This invention relates to a tubular, shrinkable, and particularly though not exclusively heat shrinkable, article that in use is shrunk on to a substrate in sealing engagement therewith.

Shrinkable, and particularly heat shrinkable, articles have been known for many years, for example being shrunk into position on a substrate to provide environmental, chemical and/or electrical protection therefor. Often the articles are internally coated with an adhesive, for example a hot melt adhesive, or sealant, such as a mastic, layer to enhance or ensure good sealing thereto, for example with the exclusion of voids. For convenience, such a material will hereinafter generically be referred to as an adhesive. In one range of application, for example, heat shrinkable sheds are applied to the termination of an outdoor medium or high voltage cable (ie. above 1 kV, and usually above 15 kV or 24 kV). A shed is a generally tubular article for providing surface contact with an outer electrically-insulating and environmental-protecting layer, usually of an electrically non-tracking polymer, of the cable termination, and has a flange or skirt extending radially from one end thereof so as in use to shed, or divert, any water or other liquid contaminant off the termination, thereby to avoid the formation of an electrically-conductive path between parts of the termination that in use are at appreciably different voltage (eg. 24 kV and earth voltage). Such sheds also increase the creepage current path length over the outer surface of the termination. To enhance or to ensure the latter function, it is usually necessary to provide an adhesive at the interface between the shed and substrate so as to fill any voids therebetween and thus to prevent flow of current or any contaminant along that interface. Typically, a heat-shrinkable shed would therefore be coated on its inner, substrate-contacting surface with a hot-melt adhesive. An article of the above kind having a plurality of flanges on its outer surface is disclosed in U.S. Pat. No. 4,045,604 (Raychem, Clabburn), the entire contents of which are herein incorporated by this reference. In general, however, the term shed also applies to an article having a tubular part and only a single skirt.

For convenience and by way of example only, reference hereinafter to a tubular article will specifically be made to a shed, although it is to be understood that any tubular article may advantageously employ the present invention.

It has been found that under certain conditions, the shed may still not be securely mounted on the substrate (cable, insulator, surge arrestor for example), and can slide a short distance therealong. Contributing factors to such relative movement are: size and weight of the shed, orientation of the substrate (vertical being the most severe), ambient temperature (higher temperatures tend to weaken the interfacial bonding), and operating conditions of the substrate. In the latter two instances, thermal cycling, as between day/night or power on/off can lead to a pumping effect on the adhesive, causing or allowing the shed to move. The adhesive, especially a hot-melt adhesive, can act to an extent, as a lubricant in such circumstances. Although a more solid adhesive, for example a high melting point adhesive, would be better than a soft mastic for solving this problem, a softer, and thus more mobile, material is itself advantageous in ensuring that all voids and potential leak paths at the interface are filled, and in ensuring that the sealing between the article and the substrate is maintained during thermal expansion and contraction.

Movement of the shed in such conditions usually takes place in a manner that results in a portion of the adhesive on the substrate being exposed beyond and adjacent an end of the shed. Electrical and/or environmental activity, such as electrical discharges or contamination, can then preferentially lead to local degradation of the substrate surface, or the end of the shed, and/or of the interface between the shed and the substrate. Creepage current, that in any event is continually (in operation, i.e. under applied voltage) flowing along the outer surface of the substrate and shed, may consequently find a path along the interface, thus electrically short-circuiting the intended path over the flanged outer surface of the shed, and negating, at least to some extent, the effect of the shed.

It is one object of the present invention to provide a tubular article and arrangement including such an article that overcomes, or at least alleviates, the above-mentioned problem with conventional tubular articles.

It is another object of the invention to provide a method of mounting a tubular article on a substrate, whereby the above-mentioned problem is overcome or at least alleviated.

In accordance with one aspect of the present invention, there is provided a tubular shrinkable article for shrinking into sealing contact with a substrate, wherein the inner surface of the article is provided with an adhesive layer and with projection means, whereby on shrinking the article on to the substrate the projection means penetrates into the adhesive layer thereby to enhance the gripping of the article on the substrate.

The projection means may comprise a single projection, or two or more, for example four, discrete projections, which may be substantially symmetrically disposed around said inner surface of the article, for example substantially on a circle.

The projection means may comprise at least two projections axially spaced apart along said inner surface of the article.

The projection means may comprise at least one continuous ring around said inner surface of the article.

The projection means may lie substantially within the wall of the article when in its expanded configuration, and project inwardly therefrom on shrinking the article into position on the substrate.

The article of the invention may be moulded with said projection means, in its fully shrunk configuration.

The adhesive layer may be provided as a coating on the inner surface of the article.

The projection means may project from the inner wall of the article, in its fully shrunk configuration, a distance that is at least equal to the thickness of the adhesive layer.

Preferably the article, advantageously shrinkable by the application of heat thereto, comprises a generally tubular portion for sealing on to the substrate, and a flange extending radially therefrom at one end, so as to form a shed.

Preferably, the article is made, for example moulded, from polymeric material such as high density polyethylene or silicone, preferably containing suitable fillers, including an anti-tracking agent. The article may be cross-linked chemically in the mould or may subsequently be cross-linked by being passed through a suitable electron beam, then heated, expanded whilst at elevated temperature, and finally cooled in its expanded configuration to produce a heat-shrinkable article.

Advantageously the projection means disappears into the thickness of the article wall during manufacture, thereby to provide a smooth inner surface for facilitating its mounting and positioning over the substrate before being heated for shrinkage, or otherwise shrunk into sealing engagement with the substrate.

In accordance with another aspect of the invention, there is provided an arrangement comprising a substrate and an article in accordance with the invention as herein described mounted thereon. The adhesive layer may be provided as a separate layer, or as a coating on the substrate.

The or each projection may be of substantially conical shape, be defined by a pair of surfaces meeting in a "V", or be of any other suitable configuration for ensuring or enhancing gripping of the tubular article on to the substrate. The or each projection may form an indentation of the outer surface of the substrate, particularly if the substrate is of polymeric material and the force due to unresolved recovery of the applied tubular article is relatively high. The article is however also suitable for substrates of other material, including porcelain.

Since a certain amount of longitudinal shrinkage can usually be expected when heat shrinkable parts are heated in position on a substrate, and in order to ensure that no portion of the adhesive is left exposed by the end of an applied article in accordance with the present invention, it is preferred that at least one projection is positioned no more than about 20 mm, and most preferably no more than 10 mm, from the "upper" end of the article, in order to secure the article in position at that end. By "upper" end is meant that end of the article which, in use, could be expected to undergo relative movement with respect to the substrate. Referring to a shed by way of example, the "upper" end would be the end of the tubular substrate-contacting portion away from the flanged end. In the event that shrinkage occurs at the flanged end, any exposed adhesive will be protected by the shadow of the flange (which usually extends downwardly and away from the substrate).

Typically the adhesive layer would be of about 0.5 mm thickness before shrinkage of the article on to the substrate, and of about 1.0 mm thickness when in position. Correspondingly, the lateral extent, or length, of the projection means would typically be about 1.0 mm, since preferably the projection means penetrates through the adhesive layer completely.

Preferably the projection means is integral with the inner surface of the tubular article.

In accordance with a further aspect of the present invention, there is provided a method of enhancing the securement of a tubular shrinkable article on a substrate, wherein projection means is provided at the interface therebetween so as to penetrate into an adhesive layer that seals the article on to the substrate.

In particular, there is provided a method of securing a tubular shrinkable article in sealing contact with a substrate, wherein an adhesive layer is provided at the interface between the article and substrate, wherein the article is shrunk into position on the substrate, and wherein projection means is arranged to penetrate the adhesive layer thereby to enhance the gripping of the article on the substrate.

Preferably the article and arrangement of article and substrate used in the method of the invention is an article or substrate in accordance with the other aspects of the invention. It is envisaged however, that an adhesive provided at the interface may include particulate material that is of sufficient particle dimension so as to act as the said projection means and thus to effect the required mechanical securement. In the latter respect for example, the adhesive may be loaded with a material, such as coarse sand, having an average particle size of approximately 2 mm, which would be greater than the thickness of the adhesive layer (say 1.0 mm) after the article has been shrunk on to a substrate of the smallest dimension.

The article may be shrinkable into position on the substrate by the application of heat, but it is also envisaged that the shrinkable article may be relaxed into position by other means. For example, the shrinkable article may be elastomeric and released from an enlarged or expanded configuration, or stretched and pushed on to the substrate. A heat shrinkable article does, however, have the advantage that the heat applied to effect its recovery will also soften the adhesive and can thus assist the projection means in forcing its way into the adhesive, and preferably into direct contact with the substrate.

The substrate to which the article of the present invention is applied may be any component, but it is envisaged that it would be an electrical component, and may be, for example, a termination of an electric power cable, an electrical power insulator, an electrical bushing, or a surge arrester. Such substrates may typically have a polymeric, or elastomeric, outer surface, to which the article needs to be adhered.

GB-A-932 916 discloses an arrangement in which a flanged bush is secured on to a cable. The mechanical securement of the bush does not involve the use of any adhesive layer and thus does not provide a seal between the bush and cable. This arrangement, therefore, does not suffer from the problem of movement of adhesive, during thermal cycling for example, whilst maintaining a sealed interface.

Heat-recoverable convoluted tubing is disclosed in WO90/02037 as applied to a wire harness, the convolutions being arranged to provide mechanical strain relief. Such an arrangement, however, does not envisage an adhesive for forming a seal on to the substrate, and furthermore, a seal is not required in the convoluted region.

DESCRIPTION OF THE DRAWINGS

Tubular articles, arrangements and methods, each in accordance with the present invention, will now be described, by way of example, with reference to the accompanying drawings, in which:

Referring to FIG. 1, a shed 2 is formed in a mould using high density polyethylene as the base polymer, containing suitable fillers for example to provide the final product with anti-tracking electrical properties and to give it resistance to degradation by ultra-violet radiation. The polymeric compound also includes a chemical cross-linking agent. As moulded, the shed 2 is tubular, having a generally cylindrical portion 4 and a skirt 6 extending radially therefrom at one end. Four projections in the form of conical pins 8 are equi-spaced on a circle and project inwardly from the inner surface of the tubular portion 4, spaced about 10 mm away from the other end of the portion 4. The pins 8 extend inwardly a distance approximately equal to half the wall thickness of the portion 4.

Figure 2:
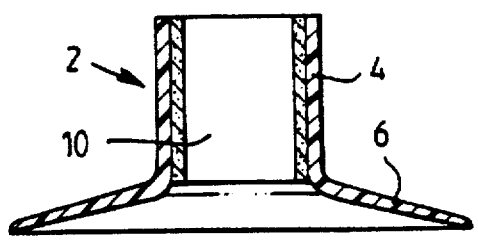
FIG. 2 is a corresponding view of the shed of FIG. 1 in its expanded and coated configuration.

After moulding, which process crosslinks the polymeric compound, the shed 2 is expanded using a mandrel to give the configuration shown in FIG. 2, where the pins 8 are not evident since they have been absorbed into the wall of the cylindrical portion 4, which now has an internal diameter enlarged by approximately 50%. A coating 10 of hot melt adhesive is then applied, by any suitable method, to the inner surface of the portion 4 of the shed 2, the thickness of the coating being approximately equal to the length, or height, of the pins 8 in the moulded configuration.

Figure 3:
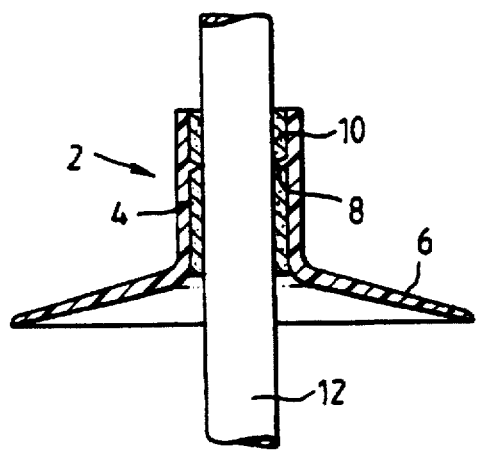
FIG. 3 is a corresponding view of the shed of FIG. 1 in position on a cable.

In operation, the expanded shed 2 is slid over an end of a polymeric high voltage cable, shown diagrammatically, at 12 in FIG. 3, and is heated by a gas torch to cause it to shrink into conformity therewith. As the tubular portion 4 reduces in diameter, the pins 8 re-appear and the adhesive 10 softens. The pins 8 project through the adhesive 10 and mechanically engage the cable 12 with little or no adhesive therebetween at those four local areas. Elsewhere over the interface between the shed portion 4 and the cable 12, a sealing bond is formed by the adhesive 10. Thus, the adhesive bond fills any voids between the shed 2 and the cable 12, thereby preventing flow of creepage current therebetween, and the four pins 8 mechanically secure the shed 2 to the cable 12 substantially in whatever orientation and under whatever environmental conditions the shedded cable is placed.

Figure 1:
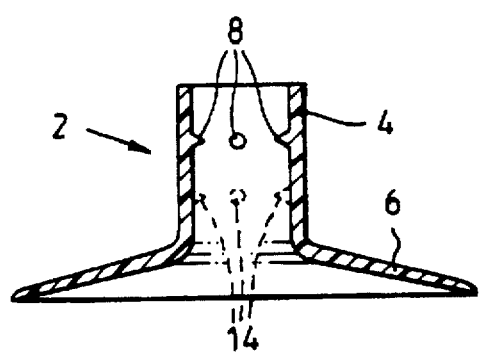
FIG. 1 is a sectional elevation through one embodiment of a shed as moulded.

If necessary, the gripping of the shed on to the cable may be enhanced by providing a larger number of projections, and as shown in outline in FIG. 1, these may be provided as a further band of pins 14 similar to but axially spaced apart from the pins 8.

Figure 4:
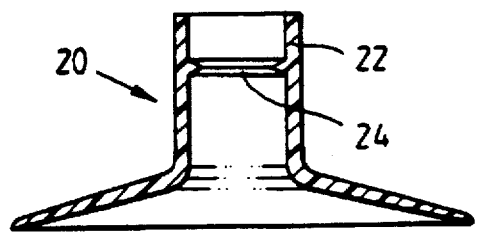
FIG. 4 is a sectional elevation through another embodiment of a shed as moulded.

FIG. 4 shows one alternative configuration of article, in which a shed 20 is moulded with an internal projection on its cylindrical portion 22 in the form of a continuous circumferential rib 24.

We claim:

1. A tubular shrinkable article for shrinking into sealing contact with a substrate, comprising a generally tubular portion for sealing to the substrate and a flange extending radially therefrom at one end, wherein the inner surface of the tubular portion is provided with an adhesive layer and with projection means, whereby on shrinking the tubular portion onto the substrate the projection means penetrates into the adhesive layer thereby to enhance the gripping of the article on the substrate.

2. An article according to claim 1, wherein the adhesive layer is provided as a coating secured to the article.

3. An article according to claim 1 wherein said projection means comprises four projections substantially symmetrically disposed around said inner surface substantially in a circle.

4. An article according to claim 1, wherein said projection means comprises at least two projections axially spaced apart along said inner surface.

5. An article according to claim 1, wherein said projection means comprises at least one continuous circumferential ring around said inner surface.

6. An article according to claim 1, wherein said projection means lies substantially within the wall of the article when in its expanded configuration, and which projects inwardly therefrom on shrinking the article into position on the substrate.

7. An article according to claim 1, wherein the article is moulded with said projection means, in its fully shrunk configuration.

8. An article according to claim 1, wherein said at least one projection projects from the inner wall of the article, in its fully shrunk configuration, a distance that is at least equal to the thickness of the adhesive layer.

9. An article according to claim 1, being shrinkable by the application of heat thereto.

10. An arrangement comprising a substrate and an article according to claim 1 shrunk thereonto.

11. A method of securing a tubular shrinkable article in sealing contact with a substrate, wherein an adhesive layer is provided at an interface between the article and substrate, wherein the article is shrunk into position on the substrate, and wherein projection means is arranged to penetrate the adhesive layer thereby to enhance the gripping of the article on the substrate.

* * * * *